US012807201B2

(12) United States Patent
Kuang

(10) Patent No.: US 12,807,201 B2
(45) Date of Patent: Nov. 24, 2026

(54) FOLDABLE TROLLEY FRAME FOR FOLDABLE TROLLEY AND FOLDABLE TROLLEY THEREOF

(71) Applicant: Zhongshan Congbao Baby Products Co., Ltd., Zhongshan City (CN)

(72) Inventor: Junhao Kuang, Linwu County (CN)

(73) Assignee: Zhongshan Congbao Baby Products Co., Ltd., Zhongshan City (CN)

(*) Notice: Subject to any disclaimer, the term of this patent is extended or adjusted under 35 U.S.C. 154(b) by 10 days.

(21) Appl. No.: 19/643,932

(22) Filed: Apr. 10, 2026

(65) Prior Publication Data

US 2026/0241969 A1 Aug. 20, 2026

(30) Foreign Application Priority Data

Mar. 26, 2026 (CN) ........................ 202620389334.0

(51) Int. Cl.
*B62B 3/00* (2006.01)
*B62B 3/02* (2006.01)
*B62B 5/00* (2006.01)

(52) U.S. Cl.
CPC .............. *B62B 3/007* (2013.01); *B62B 3/025* (2013.01); *B62B 5/0013* (2013.01); *B62B 2205/06* (2013.01)

(58) Field of Classification Search
CPC ....... B62B 3/007; B62B 3/025; B62B 5/0013; B62B 2205/06
See application file for complete search history.

(56) References Cited

U.S. PATENT DOCUMENTS

| | | | | |
|---|---|---|---|---|
| 10,464,588 | B1 * | 11/2019 | Lin | B62B 7/08 |
| 10,604,170 | B1 * | 3/2020 | Davis | B62B 3/008 |
| 10,633,010 | B1 * | 4/2020 | Zhang | B62B 3/025 |
| 11,958,520 | B1 * | 4/2024 | Sun | B62B 3/007 |
| 12,365,377 | B2 * | 7/2025 | Sun | B62B 3/02 |
| 2015/0035258 | A1 * | 2/2015 | Chen | B62B 3/007 280/651 |
| 2017/0259838 | A1 * | 9/2017 | Choi | B62B 3/007 |
| 2021/0061331 | A1 * | 3/2021 | Wu | B62B 3/022 |
| 2022/0055676 | A1 * | 2/2022 | Cui | B62B 9/12 |
| 2023/0219608 | A1 * | 7/2023 | Jiang | B62B 3/025 280/651 |
| 2025/0346276 | A1 * | 11/2025 | Lin | B62B 7/008 |
| 2026/0084735 | A1 * | 3/2026 | Wu | B62B 3/007 |

* cited by examiner

*Primary Examiner* — Erez Gurari
(74) *Attorney, Agent, or Firm* — JEEN IP LAW, LLC

(57) ABSTRACT

A foldable trolley frame for a foldable trolley, including: a side frame, a lower frame and an upper frame. The side frame has a sliding support rod and an upright rod. A lower frame has a first sliding component and a lower rod; the first sliding component is slidably connected to the upright rod. The lower rod is hingedly connected to the sliding support rod and the first sliding component. The upper frame has an upper rod and an upper folding assembly, one end of the upper rod is hingedly connected to the sliding support rod, the other end of the upper rod is hingedly connected to the upright rod. The upper folding assembly is hingedly connected to the upper rod and the lower rod. The first sliding component is slidable between an unfolded position and a folded position.

20 Claims, 12 Drawing Sheets

FOLDABLE TROLLEY FRAME FOR FOLDABLE TROLLEY AND FOLDABLE TROLLEY THEREOF

CROSS-REFERENCE TO RELATED APPLICATIONS

This application claims foreign priority of Chinese Patent Application No. 202620389334.0, filed on Mar. 26, 2026 in the China National Intellectual Property Administration, the entire disclosure of which is hereby incorporated by reference.

TECHNICAL FIELD

The present disclosure relates to the technical field of trolleys, in particular to a foldable trolley frame for a foldable trolley and a foldable trolley thereof.

BACKGROUND

When engaging in outdoor leisure activities, people frequently use foldable trolleys, particularly when it is necessary to carry infants and young children for outdoor activities. A foldable trolley not only permits infants and young children to sit or lie within the trolley, thereby facilitating the transport of infants and young children to various play locations, but also allows the placement of other outdoor items as needed, enabling the foldable trolley to function as a labor-saving and convenient transportation tool. The foldable trolley frame, serving as the core load-bearing and folding component of the foldable trolley, has a structural design that directly determines the folding convenience, storage compactness, and usage stability of the trolley.

At present, the folding/unfolding actions of existing foldable trolley frames available on the market generally require stepwise operations, whereby the user must separately control the movements of multiple rods or components to achieve folding and unfolding, without achieving integrated linkage for folding and unfolding. The operation steps are cumbersome, resulting in poor user experience. At the same time, certain foldable trolley frame structures are unreasonably designed, with unsynchronized movements among the various rods, which readily leads to motion interference and jamming phenomena, thereby affecting the smoothness of the folding/unfolding actions and potentially causing component wear, which reduces the service life of the frame.

SUMMARY

In order to overcome the deficiencies of the prior art, the present disclosure provides a foldable trolley frame for a foldable trolley that features convenient operation, smooth folding, and compact storage.

To realize the above objective, the present disclosure provides a foldable trolley frame for a foldable trolley, including: a side frame having a sliding support rod and an upright rod; a lower frame having a first sliding component and a lower rod, the first sliding component being slidably connected to the upright rod, one end of the lower rod being hingedly connected to the sliding support rod, the other end of the lower rod being hingedly connected to the first sliding component; an upper frame having an upper rod and an upper folding assembly, one end of the upper rod being hingedly connected to the sliding support rod, the other end of the upper rod being hingedly connected to the upright rod, one end of the upper folding assembly being hingedly connected to the upper rod, the other end of the upper folding assembly being hingedly connected to the lower rod; the first sliding component is slidable between an unfolded position and a folded position; when the first sliding component slides from the unfolded position toward the folded position under an external force, the lower rod rotates relative to the upright rod, the upper folding assembly rotates relative to the lower rod, the upper rod rotates relative to the upright rod, and the sliding support rod moves in a direction approaching the upright rod.

The beneficial effects of the present disclosure are as follows: through the arrangement of the foregoing structure, the foldable trolley frame of the present disclosure realizes an integrated folding/unfolding motion merely by sliding the first sliding component between the unfolded position and the folded position, thereby significantly enhancing the operational convenience and structural stability of the foldable trolley. Throughout the entire folding/unfolding motion process, the user needs only to control the first sliding component to slide linearly along the upright rod. The rapid folding and unfolding of the foldable trolley frame of the present disclosure can then be achieved through multi-stage linkage among the lower rod, the upright rod, the support rod, and the upper folding assembly. The entire process requires no additional external power source or stepwise operations; the movements of the respective rods are strictly synchronized, effectively preventing motion interference and jamming and ensuring the smoothness of the folding/unfolding actions. At the same time, the inward retraction of the sliding support rod substantially reduces the width of the frame after folding, thereby forming a compact storage configuration that greatly improves space utilization and portability. The upper folding assembly is hinged to the lower rod, which effectively simplifies the entire folding process, such that when the user performs folding process, the force can be transmitted more directly, efficiently, and smoothly through the hinged connection of the upper folding assemble hinged to the lower rod to act upon the sliding support rod that requires folding, thereby making power transmission more fluid, effectively enhancing the overall storage convenience, and improving user experience.

BRIEF DESCRIPTION OF DRAWINGS

In order to more clearly illustrate the technical solutions in the embodiments of the present disclosure, the drawings required for use in the description of the embodiments are briefly introduced below. The drawings in the following description are merely some embodiments of the present disclosure. For a person of ordinary skill in the art, other drawings may also be obtained on the basis of these drawings without involving any creative effort.

The present disclosure will be further described below with reference to the drawings and embodiments.

Figure 1:
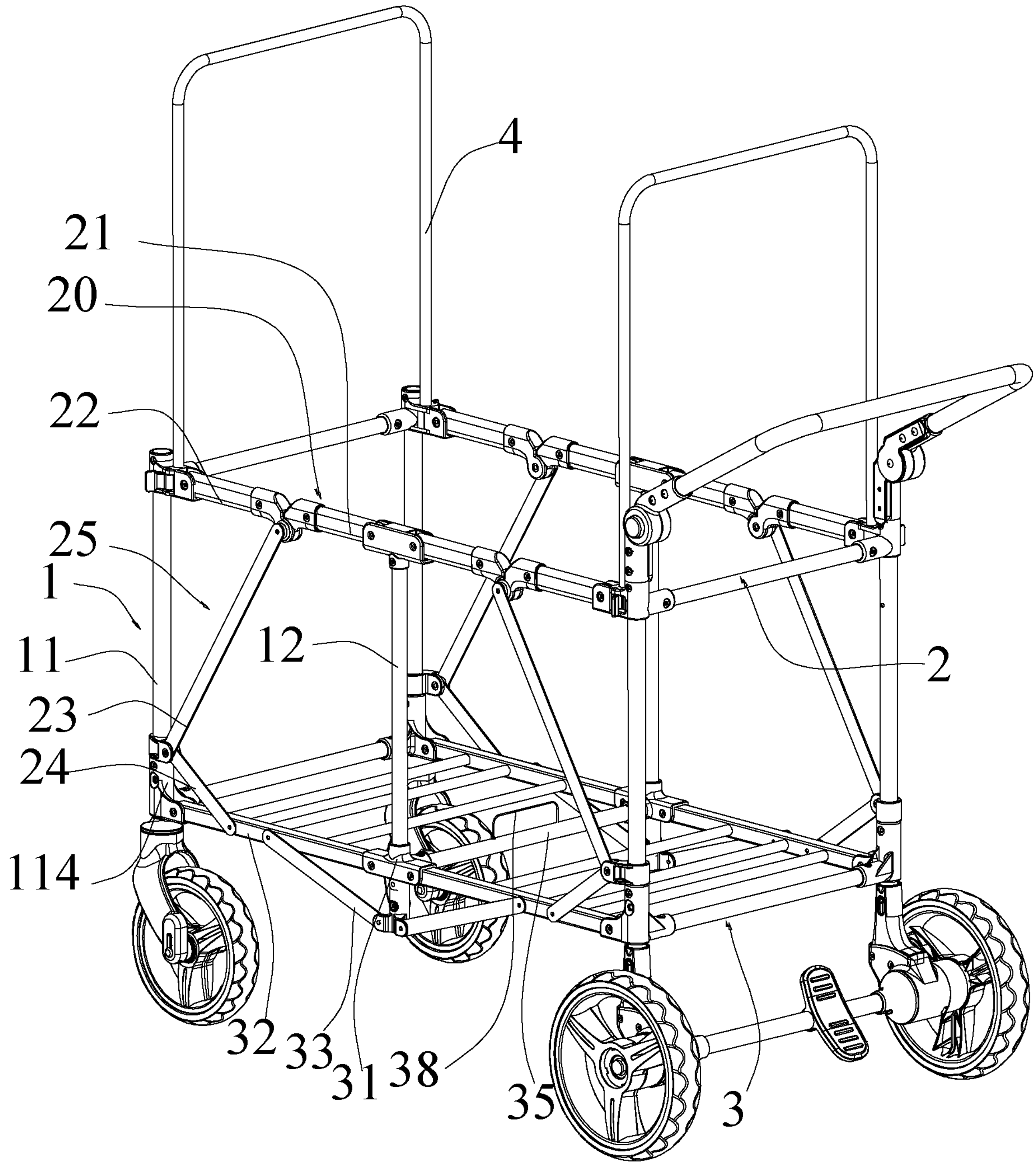
FIG. 1 is a schematic structural diagram of a foldable trolley frame in an unfolded state according to an embodiment of the present disclosure, viewed from one angle, in which a first sliding component is positioned at an unfolded position.

Description of the reference numerals:

1 side frame, 11 sliding support rod, 111 front sliding support rod, 112 rear sliding support rod, 113 second connecting component, 1131 insertion hole, 1132 opening, 1133 latching component, 1133 arc-shaped abutment surface, 114 first abutting component, 12 upright rod, 121 first connecting component, 1211 first insertion hole, 122 second abutting component, 124 locking portion, 2 upper frame, 21 first upper rod, 213 first hinging component, 22 second upper rod, 23 first upper folding rod, 233 second sliding component, 24 second upper folding rod, 3 lower frame, 31 first sliding component, 32 lower rod, 321 front lower rod, 322 rear lower rod, 33 lower folding rod, 34 locking component, 341 limiting hole, 35 hollow rod, 36 accommodating space, 37 limiting post, 38 driving component, 39 elastic reset component, 4 sunshade bracket, 20 upper rod, 201 front upper portion, 202 rear upper portion, 25 upper folding assembly, 251 front upper folding rod, 252 rear upper folding rod.

DETAILED DESCRIPTION OF THE EMBODIMENTS

In order to make the above-mentioned objects, features and advantages of the present disclosure more apparent and comprehensible, specific embodiments of the present disclosure will be described in detail below in conjunction with the accompanying drawings. In the following description, numerous specific details are set forth in order to provide a thorough understanding of the present disclosure. However, the present disclosure may be implemented in many other ways different from those described herein, and a person skilled in the art may make similar modifications without departing from the spirit of the present disclosure. Therefore, the present disclosure is not limited to the specific embodiments disclosed below.

In the description of the present disclosure, it is to be understood that when terms such as "center," "longitudinal," "transverse," "length," "width," "thickness," "upper," "lower," "front," "rear," "left," "right," "vertical," "horizontal," "top," "bottom," "inner," "outer," "facing the first direction," "facing the second direction," "axial," "radial," "circumferential," and the like appear, the orientation or positional relationships indicated by these terms are based on the orientation or positional relationships shown in the accompanying drawings, and are merely for the convenience of describing the present disclosure and simplifying the description, rather than indicating or implying that the device or element referred to must have a specific orientation, be constructed and operated in a specific orientation. Therefore, such terms cannot be construed as limiting the present disclosure.

Furthermore, when the terms "first" and "second" appear, these terms are used for descriptive purposes only and cannot be construed as indicating or implying relative importance or implicitly indicating the number of the indicated technical features. Thus, a feature defined as "first" or "second" may explicitly or implicitly include at least one of the features. In the description of the present disclosure, when the term "plurality" appears, the meaning of "plurality" is at least two, for example two, three, etc., unless otherwise expressly and specifically limited.

In the present disclosure, unless otherwise expressly specified and limited, when terms such as "mounted," "connected," "coupled," "fixed," and the like appear, these terms shall be interpreted in a broad sense. For example, it may be a fixed connection, a detachable connection, or an integral connection; it may be a mechanical connection or an electrical connection; it may be a direct connection or an indirect connection through an intermediate medium; it may be an internal communication between two elements or an interaction relationship between two elements, unless otherwise expressly limited. For a person of ordinary skill in the art, the specific meanings of the above terms in the present disclosure can be understood according to specific circumstances.

In the present disclosure, unless otherwise expressly specified and limited, when a description such as a first feature being "on" or "under" a second feature or the like appears, its meaning may be that the first and second features are in direct contact, or that the first and second features are in indirect contact through an intermediate medium. Moreover, the first feature being "above," "over," or "on" the second feature may mean that the first feature is directly above or obliquely above the second feature, or merely that the horizontal height of the first feature is higher than that of the second feature. The first feature being "below," "under," or "beneath" the second feature may mean that the first feature is directly below or obliquely below the second feature, or merely that the horizontal height of the first feature is lower than that of the second feature.

It should be noted that if an element is referred to as being "fixed to" or "disposed on" another element, it may be directly on the other element or there may be an intervening element. If an element is considered to be "connected to" another element, it may be directly connected to the other element or there may be an intervening element present. If present, the terms "vertical," "horizontal," "upper," "lower," "left," "right," and similar expressions used in the present disclosure are for illustrative purposes only and do not indicate that they are the only embodiments.

Figure 2:
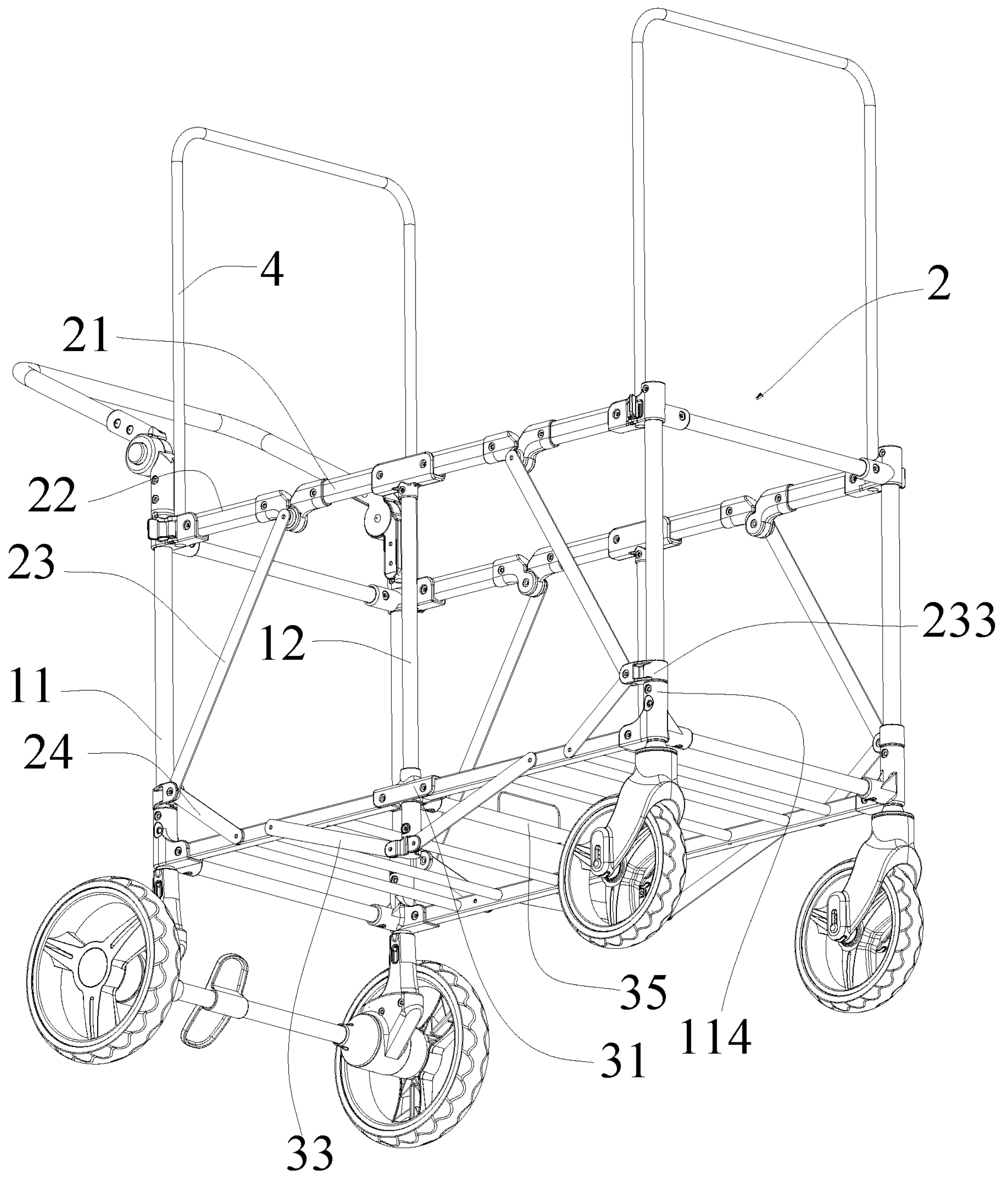
FIG. 2 is a schematic structural diagram of the foldable trolley frame in the unfolded state, viewed from another angle, in which the first sliding component is positioned at the unfolded position.
Figure 3:
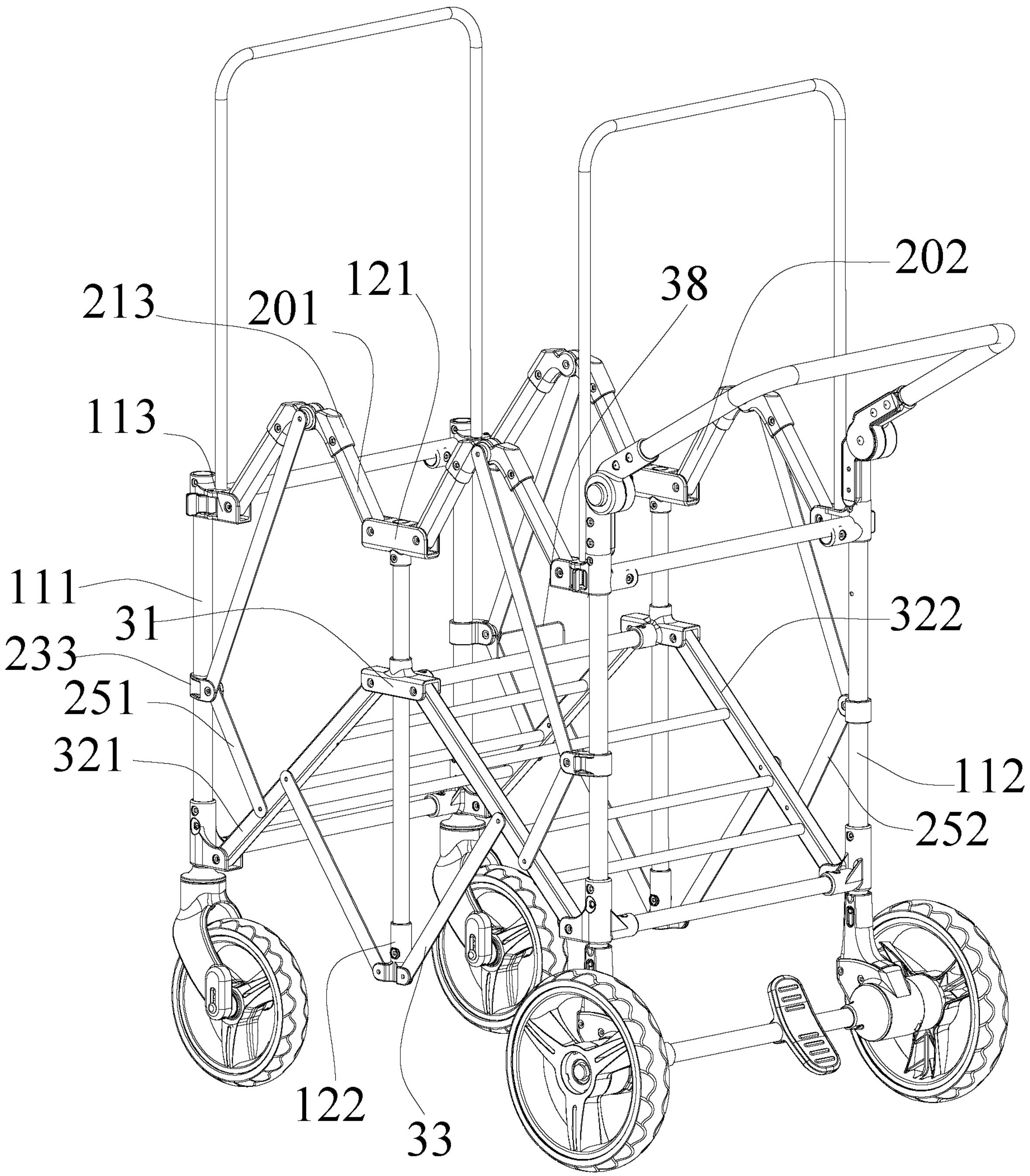
FIG. 3 is a schematic structural diagram of the foldable trolley frame, in which the first sliding component is sliding from the unfolded position toward the folded position.
Figure 4:
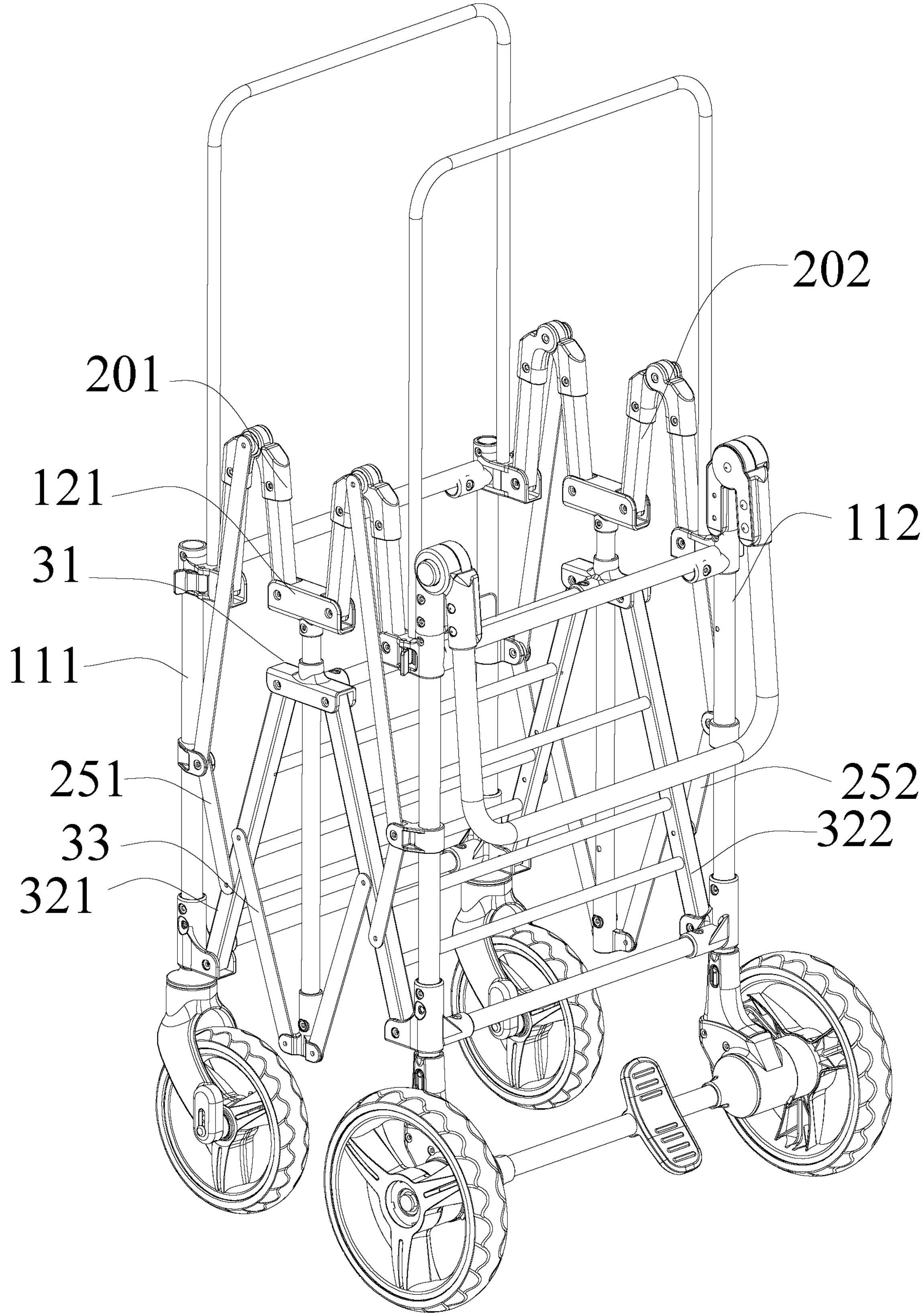
FIG. 4 is a schematic structural diagram of the foldable trolley frame, in which the first sliding component is positioned at the folded position.
Figure 5:
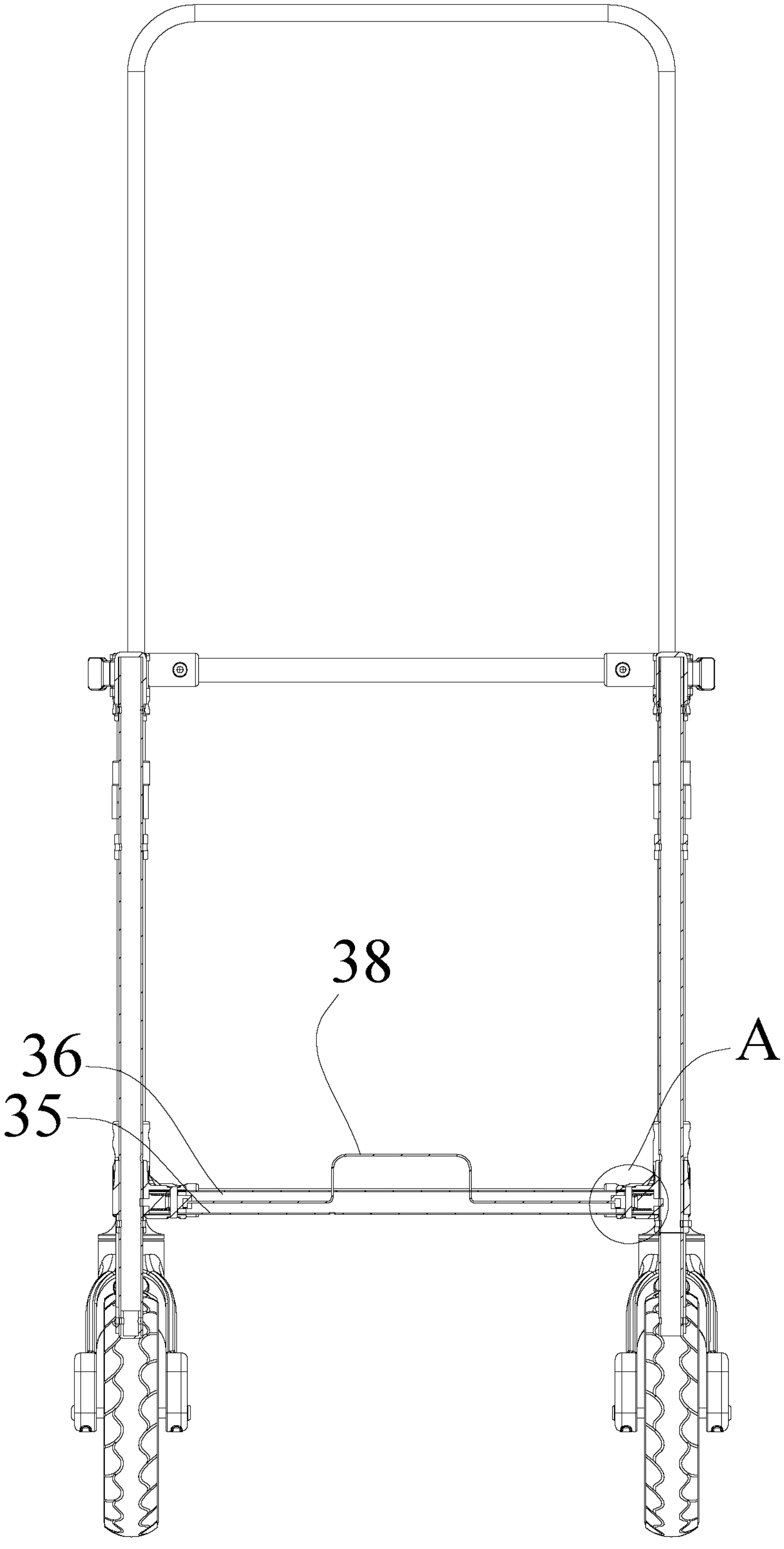
FIG. 5 is a schematic structural diagram of the foldable trolley frame, in which a locking component is positioned at the folded position.
Figure 6:
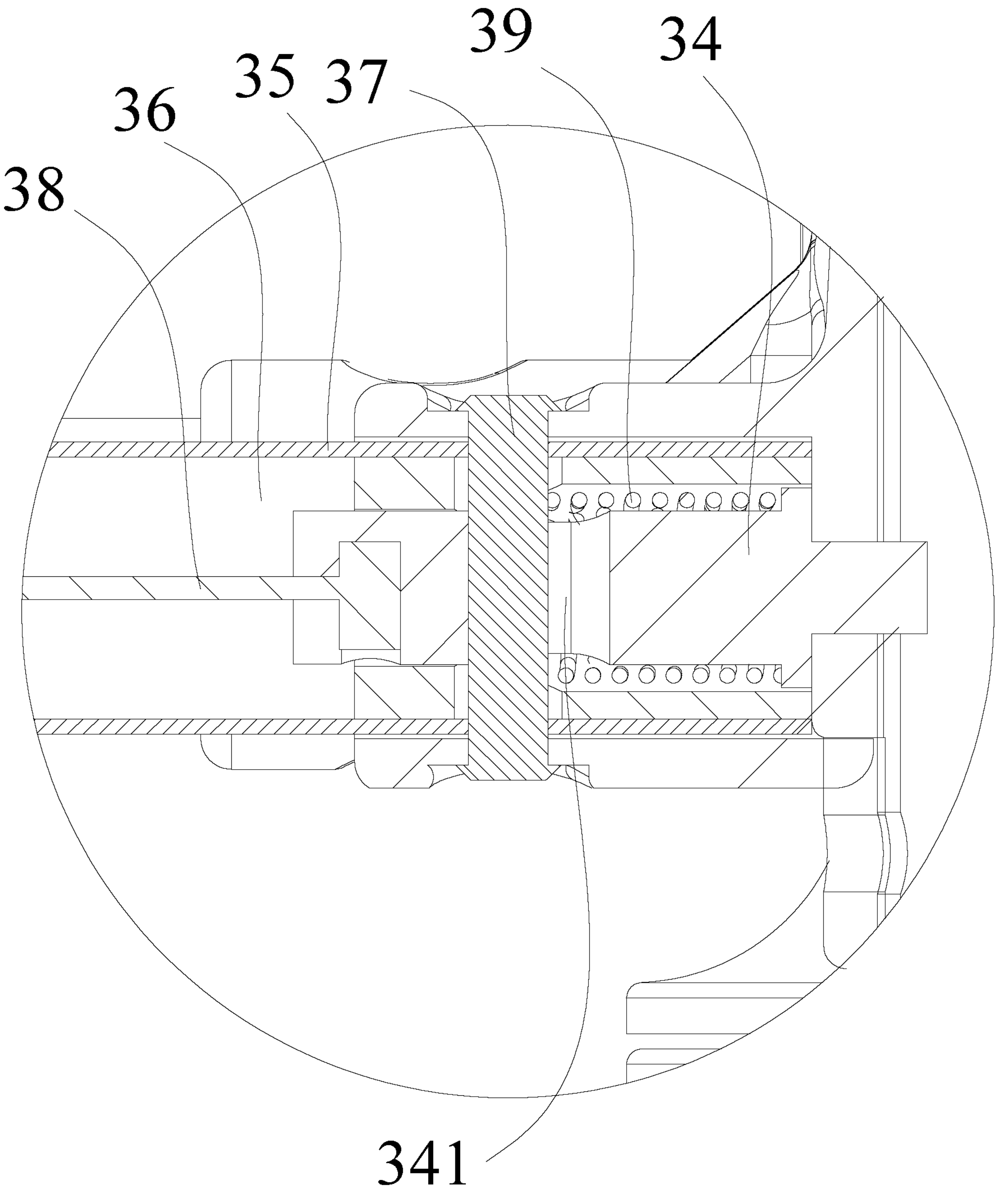
FIG. 6 is an enlarged view of the circled portion A in FIG. 5.
Figure 7:
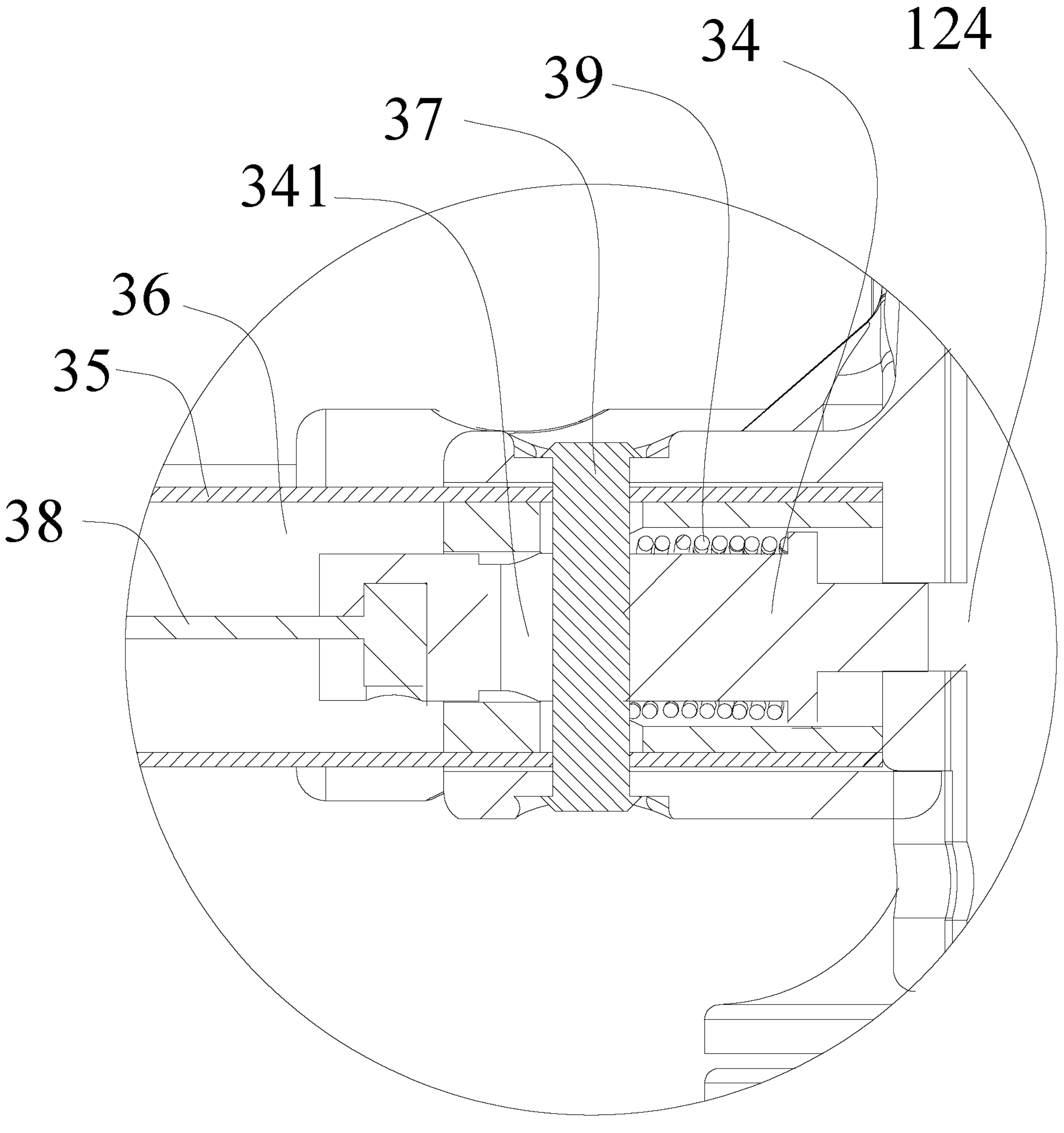
FIG. 7 is a schematic structural diagram of the foldable trolley frame, in which a locking component is positioned at the unfolded position.
Figure 8:
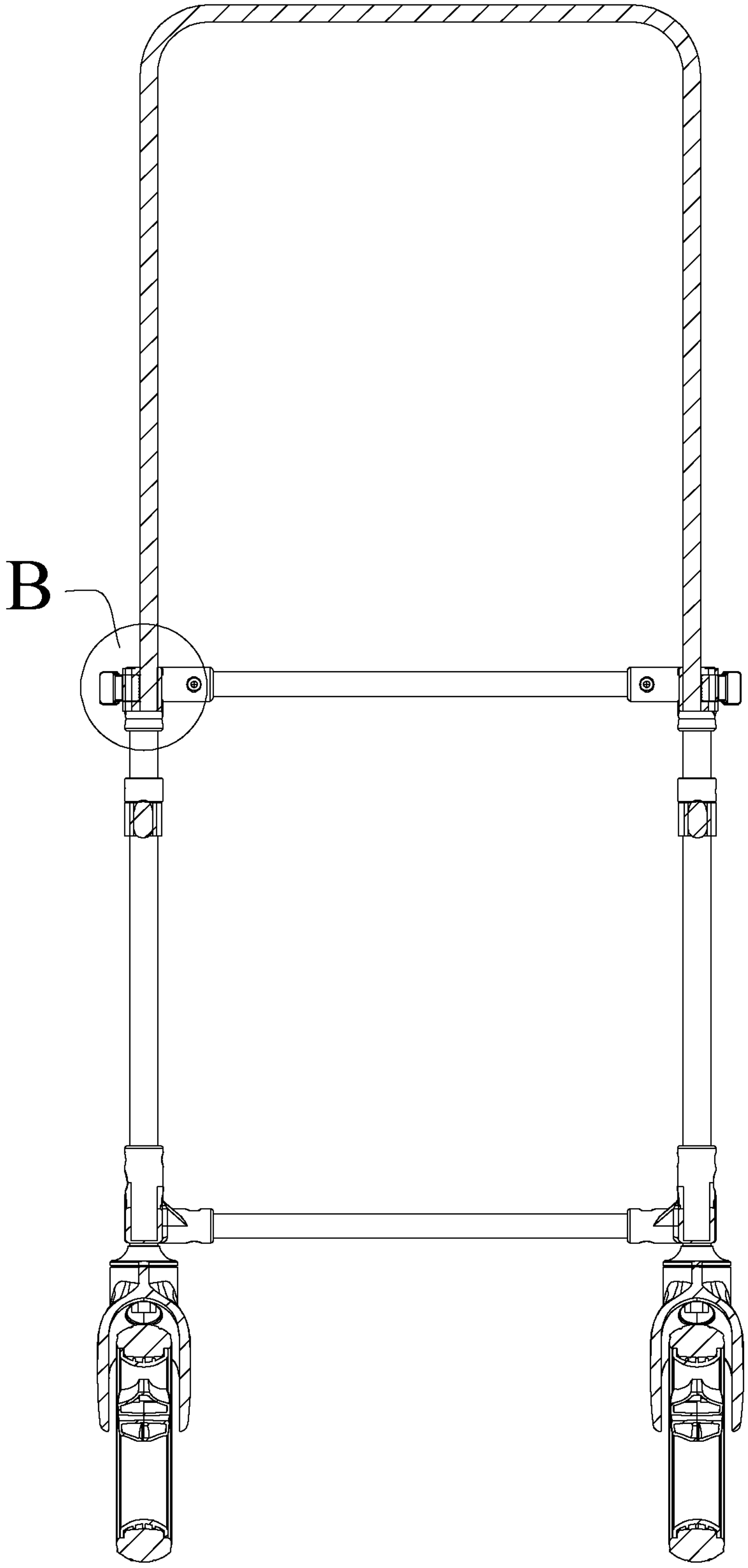
FIG. 8 is a cross-sectional view of the foldable trolley frame, in which a latching component is located at a first position.
Figure 9:
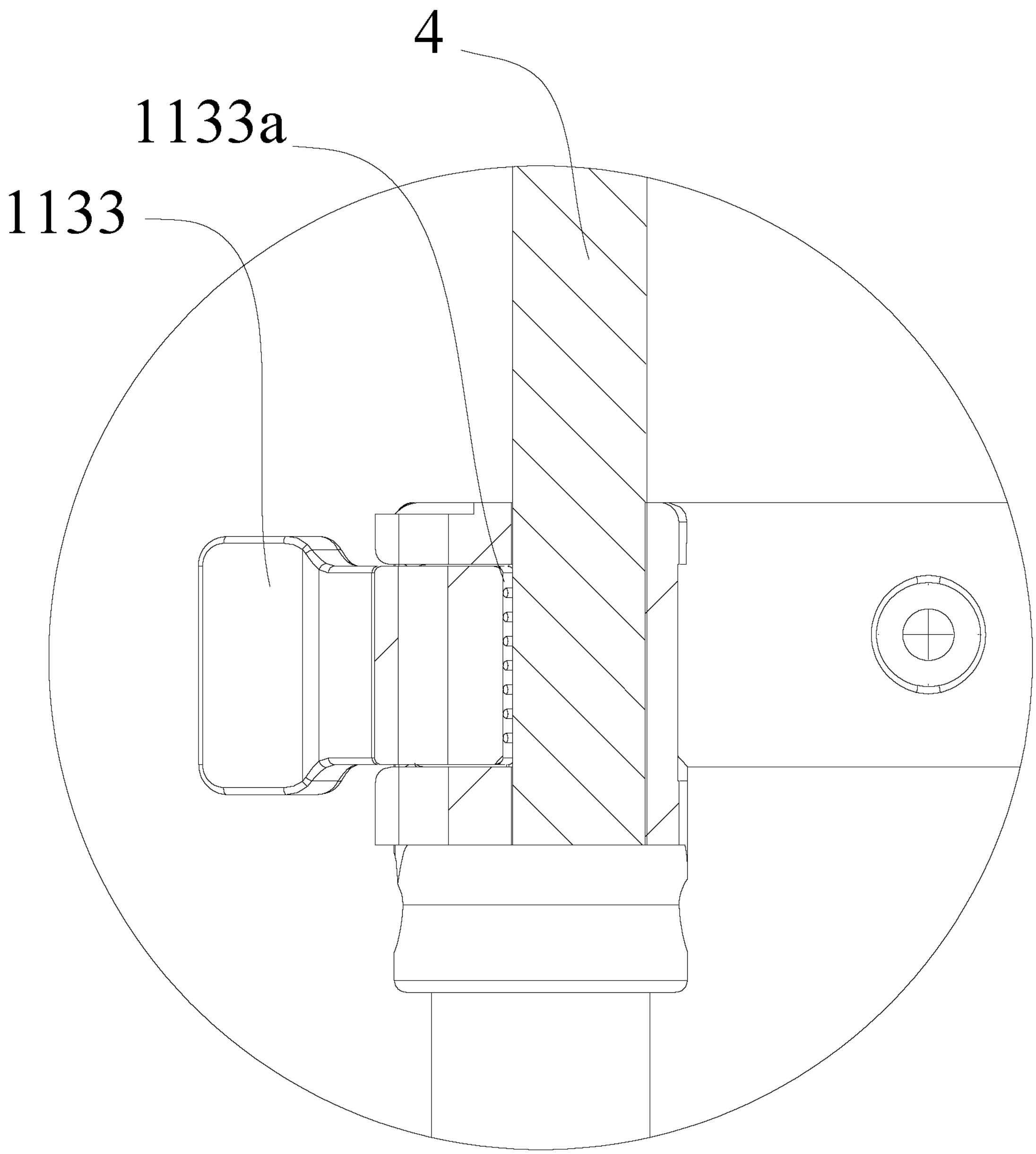
FIG. 9 is an enlarged view of the circled portion B in FIG. 8.
Figure 10:
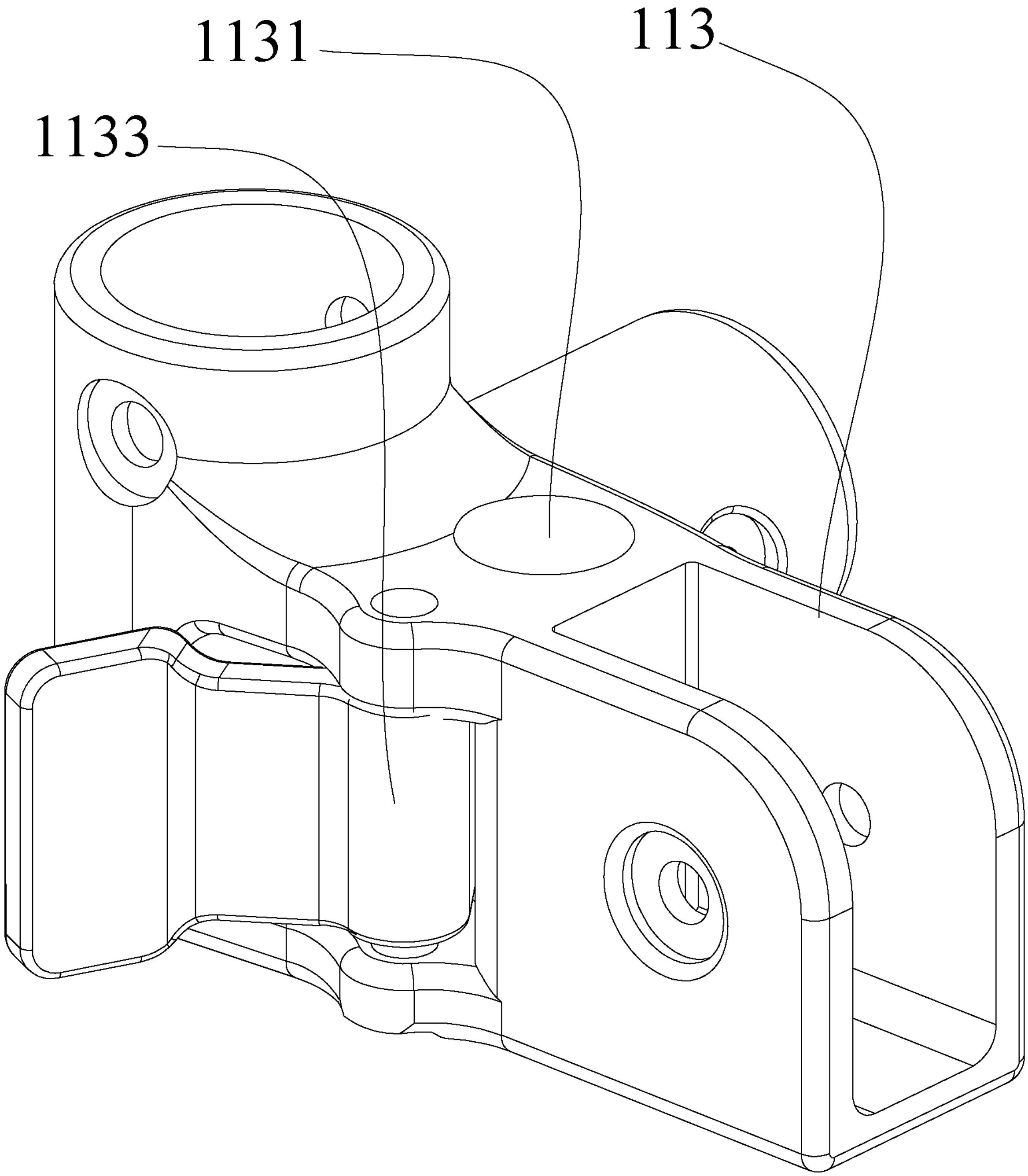
FIG. 10 is a schematic structural diagram of a second connecting component of the foldable trolley frame.
Figure 11:
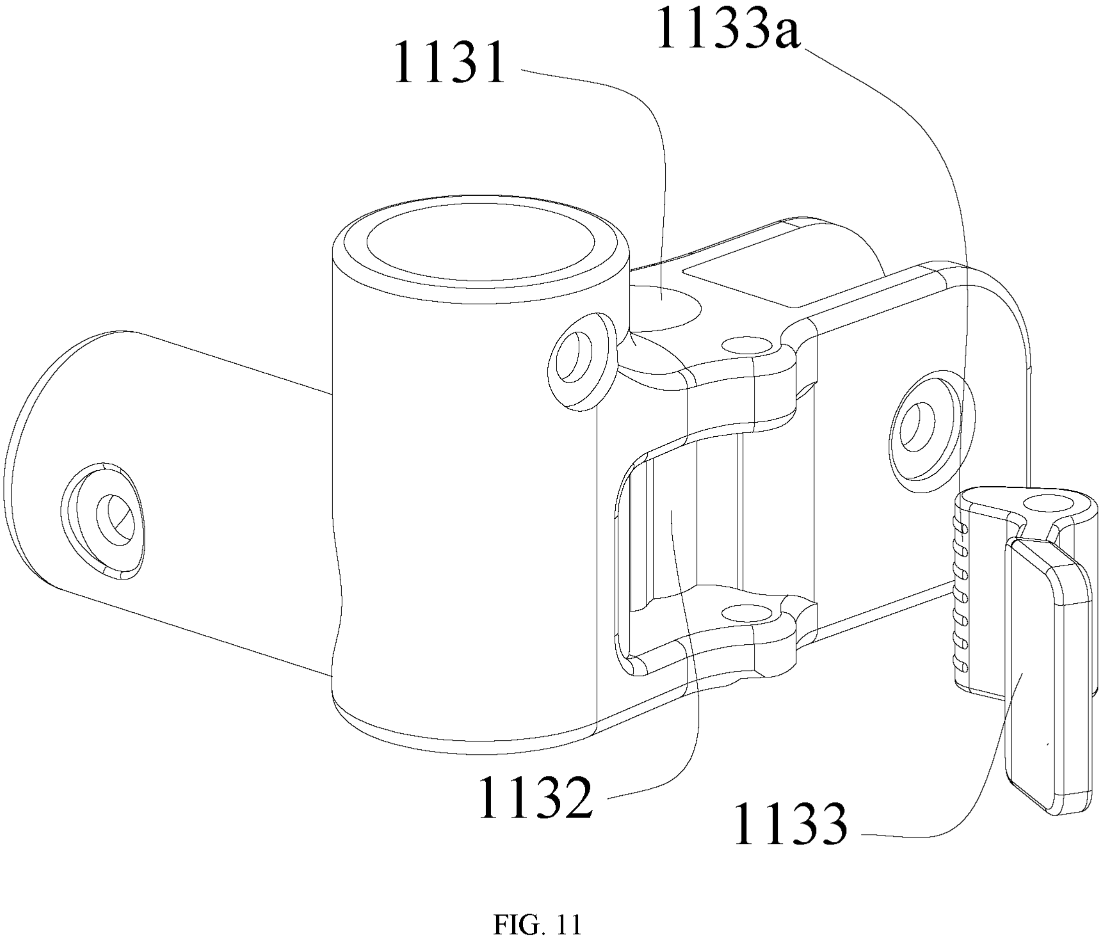
FIG. 11 is an exploded schematic structural diagram of the second connecting component of the foldable trolley frame.
Figure 12:
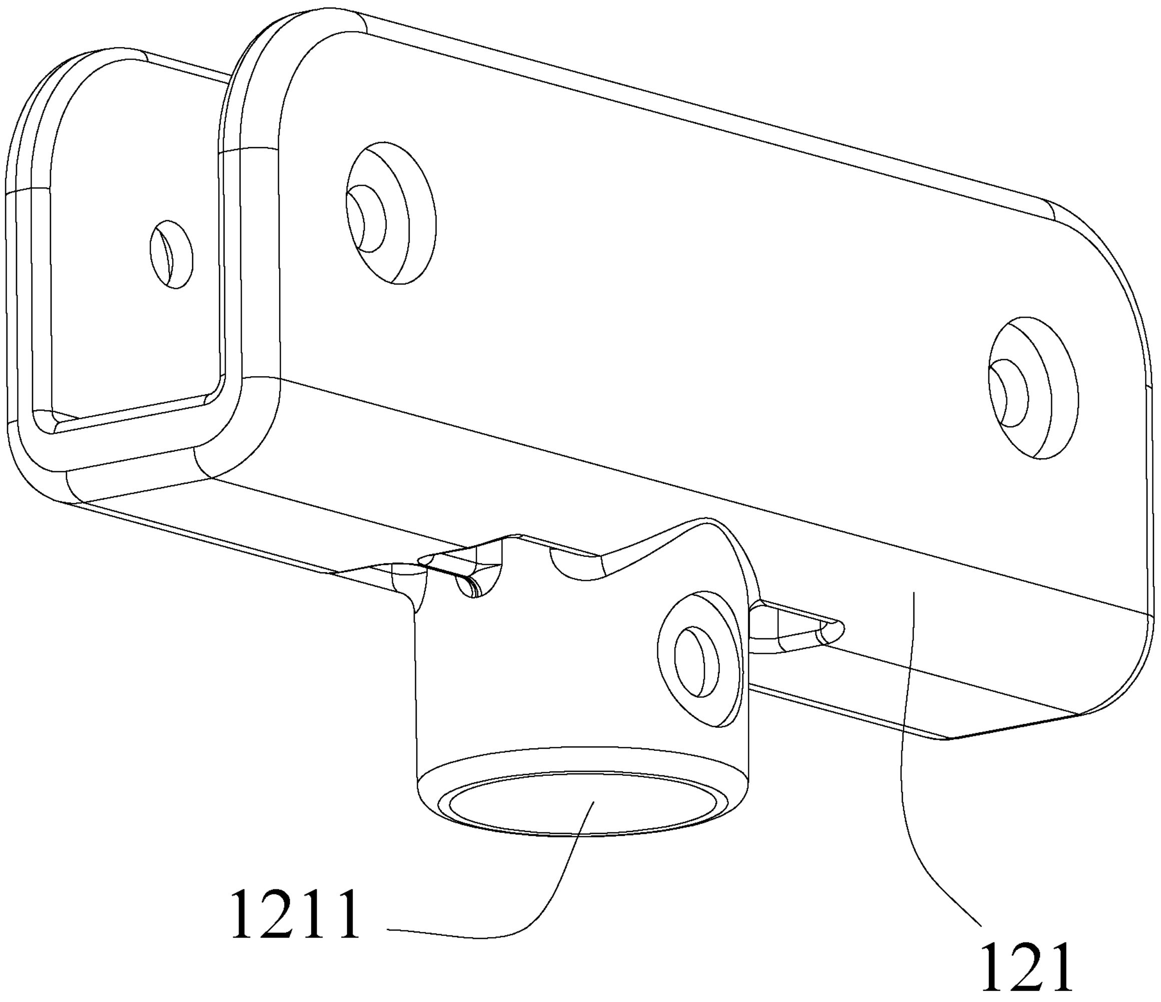
FIG. 12 is a schematic structural diagram of a first connecting component of the foldable trolley frame.

Referring to FIGS. 1 to 12, which illustrate a foldable trolley to which the foldable trolley frame of the present disclosure is applied, the foldable trolley frame includes: a side frame 1, a lower frame 3, and an upper frame 2. The side frame 1 includes a sliding support rod 11 and an upright rod 12.

The lower frame 3 includes a first sliding component 31 and a lower rod 32, the first sliding component 31 is slidably connected to the upright rod 12. One end of the lower rod 32 is hingedly connected to the sliding support rod 11, and the other end is hingedly connected to the first sliding component 31.

The upper frame 2 includes an upper rod 20 and an upper folding assembly 25. One end of the upper rod 20 is hingedly connected to the sliding support rod 11, the other end of the upper rod 20 is hingedly connected to the upright rod 12. One end of the upper folding assembly 25 is hingedly connected to the upper rod 20, and the other end of the upper folding assembly 25 is hingedly connected to the lower rod 32.

The first sliding component 31 is slidable between an unfolded position and a folded position.

When the first sliding component 31 slides from the unfolded position toward the folded position under an external force, the lower rod 32 rotates relative to the upright rod 12, the upper folding assembly 25 rotates relative to the lower rod 32, the upper rod 20 rotates relative to the upright rod 12, and the sliding support rod 11 moves in a direction approaching the upright rod 12.

The foldable trolley frame of the present embodiment realizes an integrated folding/unfolding motion process merely by driving the first sliding component 31 to slide between the unfolded position and the folded position, thereby significantly improving the operational convenience and structural stability of the foldable trolley. During the entire folding/unfolding motion process, the user only needs to control the first sliding component 31 to slide linearly along the upright rod 12, and the rapid folding and deployment of the foldable trolley frame of the present embodiment can be achieved through multi-stage linkage among the lower rod 32, the upright rod 12, the sliding support rod 11, the upper rod 20, and the upper folding assembly 25. The entire folding/unfolding motion process requires no additional external power source or step-by-step operations, the motions of the respective rods are strictly synchronized, motion interference and jamming are effectively avoided, and the smoothness of the folding/unfolding motion process is ensured. At the same time, the inward retraction of the sliding support rod 11 greatly reduces the width of the frame after folding, thereby forming a compact folded configuration and substantially improving space utilization and portability. Specifically, in the present embodiment, when the first sliding component 31 slides from the unfolded position toward the folded position under an external force, the sliding of the first sliding component 31 drives the lower rod 32 to rotate relative to the upright rod 12, the rotation of the lower rod 32 relative to the upright rod 12 drives the upper folding assembly 25 to rotate relative to the lower rod 32, the rotation of the upper folding assembly 25 relative to the lower rod 32 drives the upper rod 20 to rotate relative to the upright rod 12, and the rotation of the upper rod 20 relative to the upright rod 12 drives the sliding support rod 11 to move in a direction approaching the upright rod 12. By hingedly connecting the upper folding assembly 25 to the lower rod 32, the entire folding process is effectively simplified, so that when the user performs folding operation, the force can be transmitted more directly, efficiently, and smoothly through the hinged connection of the upper folding assembly 25 to the lower rod 32 to act on the upper rod 20 that needs to be folded, thereby making power transmission smoother, effectively improving the overall convenience of folding, and enhancing user experience.

In this embodiment, the lower frame 3 further includes a lower folding rod 33, one end of the lower folding rod 33 is hingedly connected to the lower rod 32, and the other end of the lower folding rod 33 is hingedly connected to the upright rod 12.

An intermediate linkage transmission and a support structure are constructed between the lower rod 32 and the upright rod 12, such that the lower rod 32, the lower folding rod 33 and the upright rod 12 together form a complete hinged linkage mechanism, thereby further enhancing the overall stability of the lower frame 3. Meanwhile, in synergistic cooperation with components such as the first sliding component 31 and the sliding support rod 11, the smoothness of motion, the synchronization of actions and the structural reliability of the foldable trolley frame during the unfolding/folding motion process are substantially enhanced, and a compact folded configuration is also facilitated.

Specifically, when the first sliding component 31 slides from the unfolded position toward the folded position under an external force, the sliding motion of the first sliding component 31 drives the lower rod 32 to rotate relative to the upright rod 12, and the rotation of the lower rod 32 relative to the upright rod 12 in turn drives the lower folding rod 33 to rotate relative to the lower rod 32. The lower folding rod 33 functions as a support link between the lower portion of the upright rod 12 and the lower rod 32, thereby ensuring that each folding motion process is confined to a fixed folding trajectory, effectively improving the stability of folding. At the same time, the lower folding rod 33 also provides a supporting function for the upright rod 12 and the lower rod 32 during the folding and stowing process.

In this embodiment, the upper folding assembly 25 includes a first upper folding rod 23 and a second upper folding rod 24. A first end of the first upper folding rod 23 is hingedly connected to the first upper rod 21, a second end of the first upper folding rod 23 is slidably connected to the sliding support rod 11. A first end of the second upper folding rod 24 is hingedly connected to the second end of the first upper folding rod 23, and a second end of the second upper folding rod 24 is hingedly connected to the lower rod 32. The upper rod 20 includes a first upper rod 21 and a second upper rod 22. A first end of the first upper rod 21 is hingedly connected to the upright rod 12, a first end of the second upper rod 22 is hingedly connected to the second end of the first upper rod 21, and a second end of the second upper rod 22 is hingedly connected to the sliding support rod 11.

The upper rod 20 is configured as a multi-linkage mechanism in which the first upper rod 21, the second upper rod 22, the first upper folding rod 23, and the second upper folding rod 24 are mutually hingedly connected to form a cooperative linkage. Each rod forms ordered kinematic pairs through precise hinge pivot points and sliding fits, perfectly matching the complex motion trajectories of the foldable trolley frame during folding and unfolding, effectively preventing motion interference, jamming or locking between the rod members, and thereby ensuring that the folding and unfolding actions of the entire frame are smooth, continuous, stable and reliable.

More specifically, the first end of the first upper rod 21 is hingedly connected to the upright rod 12, thereby forming a fixed hinge reference point of the upper rod 20. This fixed hinge reference point provides stable support for the entire upper rod 20, ensuring the stability and accuracy of the upper rod 20 throughout its motion and preventing deviation or shaking. The two ends of the second upper rod 22 are hingedly connected respectively to the first upper rod 21 and the sliding support rod 11, thereby forming a flexible hinged connection structure that enables synchronous angular adjustment in accordance with the displacement of the sliding support rod 11. During the folding motion process of the entire frame, the first upper rod 21 and the second upper rod 22 can rotate synchronously and drive the sliding support rod 11 to move toward the upright rod 12, effectively avoiding motion interference between the rods and guaranteeing smooth movement of the sliding support rod 11 when approaching or moving away from the upright rod 12. One end of the first upper folding rod 23 is hingedly connected to the first upper rod 21 while the other end forms a sliding fit with the sliding support rod 11, thereby possessing both a rotational function relative on the first upper rod 21 and a sliding function along the sliding support rod 11. During the entire folding motion process, the first upper folding rod 23 can flexibly adjust its own position, drive the first upper rod 21 and the second upper rod 22 to rotate, and adapt to the deformation of the entire frame, thereby preventing motion jamming caused by positional deviation while ensuring smooth completion of the folding motion process of the entire frame. The two ends of the second upper folding rod 24 are hingedly connected respectively to the second end of the first upper folding rod 23 and to the lower rod 32, serving as a linkage transmission component between the upper rod 20 and the lower rod 32. The second upper folding rod 24 can synchronously transmit the motion of the lower rod 32 to the entire upper rod 20, ensuring that the motions of the upper rod 20 and the lower frame 3 remain coordinated and consistent. When the first sliding component 31 drives the lower rod 32 to rotate, the second upper folding rod 24 can synchronously drive the first upper folding rod 23 and the entire upper rod 20 to undergo corresponding deformation, thereby guaranteeing smooth and non-disjointed linkage between the upper and lower structures during folding and unfolding of the frame. When the frame is unfolded in the use state, the respective links mutually support one another to form a stable triangular support configuration, substantially increasing the overall rigidity and load-bearing capacity of the upper frame 2 and effectively withstanding external forces encountered during use of the foldable trolley. When the frame is folded, under the driving action of the first sliding component 31, the respective links rotate stepwise and converge to fold, cooperating with the sliding action at the sliding end to achieve rapid retraction of the upper rod 20, thereby driving folding of the entire frame, significantly reducing the overall occupied space of the foldable trolley after folding and facilitating storage and transportation. Meanwhile, the multi-point hinging and sliding-fit design can reasonably distribute forces, reduce local stress concentrations, extend the service life of each rod member, further optimize the linkage relationship and structural reliability of the foldable trolley frame, and enhance the overall performance of the foldable trolley.

In this embodiment, the sliding support rod 11 includes a front sliding support rod 111 and a rear sliding support rod 112 that are symmetrically arranged on two sides of the upright rod 12. Correspondingly, to implement the multi-linkage mechanism described above, the upper rod 20 includes a front upper portion 201 and a rear upper portion 202 that are symmetrically arranged on two sides of the upright rod 12. The upper folding assembly 25 includes a front upper folding rod 251 and a rear upper folding rod 252 that are symmetrically arranged on two sides of the upright rod 12. The lower rod 32 includes a front lower rod 321 and a rear lower rod 322 that are symmetrically arranged on two sides of the upright rod 12. One end of the front upper portion 201 is hingedly connected to the front sliding support rod 111 and the other end of the front upper portion 201 is hingedly connected to the upright rod 12. Likewise, one end of the rear upper portion 202 is hingedly connected to the rear sliding support rod 112 and the other end of the rear upper portion 202 is hingedly connected to the upright rod 12. Similarly, one end of the front upper folding rod 251 is hingedly connected to the front upper portion 201 and the other end of the front upper folding rod 251 is hingedly connected to the front lower rod 321. One end of the rear upper folding rod 252 is hingedly connected to the rear upper portion 202 and the other end of the rear upper folding rod 252 is hingedly connected to the rear lower rod 322. One end of the front lower rod 321 is hingedly connected to the front sliding support rod 111 and the other end of the front lower rod 321 is hingedly connected to the first sliding component 31. One end of the rear lower rod 322 is hingedly connected to the rear sliding support rod 112 and the other end of the rear lower rod 322 is hingedly connected to the first sliding component 31.

The sliding support rod 11, the upper rod 20, the upper folding assembly 25 and the lower rod 32 are each correspondingly divided into front and rear groups, and the front and rear groups are symmetrically arranged on two sides of the upright rod 12, thereby forming a structurally balanced and symmetrically loaded foldable trolley frame. This configuration ensures that, both in the unfolded position and during the transition from the unfolded position to the folded position, the forces on the two sides of the upright rod 12 remain balanced and symmetrical at all times, effectively preventing structural tilting, deformation or jamming caused by excessive unilateral loading. The driving force transmitted by the first sliding component 31 can thus be uniformly and symmetrically delivered to the front and rear groups of rod members, driving the upright rod 12 to move steadily upward, enabling the symmetrically arranged portions on the front and rear sides to rotate synchronously, and thereby guaranteeing the synchronization, smoothness and stability of the entire folding/unfolding motion process while avoiding the problems of unilateral component motion lag, instability or unsmooth folding.

In this embodiment, one end of the front lower folding rod 331 is hinged to the middle portion of the lower rod 32, the other end of the front lower folding rod 331 is hinged to the lower portion of the upright rod 12. One end of the rear lower folding rod 332 is hinged to the middle portion of the lower rod 32, and the other end of the rear lower folding rod 332 is hinged to the lower portion of the upright rod 12.

Through the symmetrical arrangement of the front lower folding rod 331 and the rear lower folding rod 332, the structural stability and linkage coordination of the lower frame 3 are further optimized. One end of the front lower folding rod 331 is hinged to the middle of the lower rod 32, the other end is hinged to the lower portion of the upright rod 12. The rear lower folding rod 332 adopts a hinging manner symmetrical to that of the front lower folding rod 331. The two form a symmetrical support structure, which can effectively enhance the connection strength between the lower rod 32 and the upright rod 12, disperse the load borne by the lower rod 32, avoid bending or deformation of the lower rod 32 during the force-bearing process, and simultaneously improve the overall structural rigidity of the lower frame 3, thereby ensuring the load-bearing stability of the foldable trolley frame of the present disclosure in the use state. In addition, when the front lower folding rod 331 and the rear lower folding rod 332 rotate synchronously with the lower rod 32, they can further guide the folding motion of the upright rod 12 and the sliding support rod 11, ensuring that the folding action is coordinated and orderly.

In this embodiment, the lower frame 3 further includes a locking component 34. The locking component 34 is connected to the first sliding component 31, and the locking component 34 is movable between a locked position and an unlocked position. When the locking component 34 is located at the locked position, the locking component 34 restricts the first sliding component 31 from sliding from the unfolded position toward the folded position. When the locking component 34 is located at the unlocked position, the first sliding component 31 can slide along the unfolded position toward the folded position.

When the locking component 34 is located at the locked position, it can effectively restrict the first sliding component 31 from sliding from the unfolded position toward the folded position, thereby firmly locking the first sliding component 31 in the unfolded position and indirectly locking all linked components such as the first upper rod 21, the second upper rod 22, the lower rod 32, the lower folding rod 33, and the upright rod 12, ensuring that the foldable trolley frame maintains a stable unfolded structure in the use state, effectively preventing the first sliding component 31 from accidentally sliding and the frame from folding by itself due to factors such as the weight of the carried object, external force impact, or vibration, thereby avoiding tipping, component damage, or safety hazards during use, and guaranteeing the load-bearing stability and safety of the frame during use. When the locking component 34 is located at the unlocked position, its restriction on the first sliding component 31 is released, allowing the first sliding component 31 to slide smoothly along the upright rod 12 and thereby drive a series of linked actions such as the rotation of the first upper rod 21, the second upper rod 22, the lower rod 32, and the lower folding rod 33 as well as the sliding support rod 11, ensuring that the frame can complete the folding operation smoothly without affecting the fluency of the folding process. The entire locking/unlocking switch is simple and convenient, requiring no complex operations. It not only achieves reliable locking of the frame in the use state but also does not increase the user's operational burden or interfere with the movement of other components, further improving the overall structural rationality and practicality of the frame while meeting the dual requirements of safety, reliability, and operational convenience.

In this embodiment, the lower frame 3 further includes a driving component 38, the driving component 38 is connected to the locking component 34. The driving component 38 drives the locking component 34 to move from the locked position to the unlocked position. When the locking component 34 is located at the unlocked position, the driving component 38 drives the first sliding component 31 to slide from the unfolded position toward the folded position.

The unlocking of the locking component 34 and the folding sliding of the first sliding component 31 can be achieved by performing only a single operation on the driving component 38, without the user having to separately operate the unlocking and folding structures, thereby simplifying the operation steps and realizing one-handed, one-button folding, which significantly enhances the operation experience and operational efficiency. While driving the locking component 34 to move from the locked position to the unlocked position to release the restriction on the sliding of the first sliding component 31, the driving component 38 can also synchronously drive the first sliding component 31 to slide along the upright rod 12 from the unfolded position toward the folded position, making the unlocking step and the folding sliding step seamlessly connected and synchronously completed. This effectively avoids the lag, jamming, or misoperation risks caused by the traditional "first unlock, then fold" step-by-step operation, ensures highly synchronized linkage actions of all parts of the foldable trolley frame, and prevents motion interference or uneven force distribution among the various parts.

In this embodiment, the lower frame 3 further includes a hollow rod 35, the hollow rod 35 is connected to the first sliding component 31. The hollow rod 35 is provided with an accommodating space 36 inside, the locking component 34 is located within the accommodating space 36, and the radial length of the locking component 34 corresponds exactly to that of the accommodating space 36, so that the locking component 34 can only move axially along the accommodating space 36.

The locking component 34 is located within the accommodating space 36, to effectively prevent the locking component 34 from being damaged by external force impact or friction during the folding or use of the frame. At the same time, the radial length of the locking component 34 being adapted to the radial length of the accommodating space 36, so as to strictly restrict the radial displacement of the locking component 34, allowing it to move only axially along the accommodating space 36, thereby avoiding skewing or jamming of the locking component 34 during the locking or unlocking process and ensuring that the locking component 34 can move smoothly in the axial direction to switch between the locking and unlocked positions.

In this embodiment, the lower frame 3 further includes a limiting post 37, the limiting post 37 passes through the hollow rod 35 and the outer wall of the first sliding component 31, and a portion of the limiting post 37 is located within the accommodating space 36. When the locking component 34 is located at the unlocked position, the locking component 34 abuts against the limiting post 37.

The limiting post 37 passes through the hollow rod 35 and the outer wall of the first sliding component 31, thus effectively preventing relative loosening or displacement between the hollow rod 35 and the first sliding component 31, avoiding the risk of the hollow rod 35 shifting or detaching due to vibration or external force during frame folding or use, thereby ensuring the stability of the installation and movement of the locking component 34. At the same time, the portion of the limiting post 37 located within the accommodating space 36 and abutting against the locking component 34 when the locking component 34 is in the unlocked position can effectively restrict the axial movement stroke of the locking component 34, eliminating problems such as locking mechanism failure or inability to reset caused by excessive unlocking, thereby guaranteeing the accuracy of the unlocked position and the stability of movement from the locked position to the unlocked position. In addition, when the locking component 34 is located at the unlocked position, the locking component 34 abutting against the limiting post 37 can also provide the user with physical feedback, helping the user accurately perceive that the locking component 34 has moved to the unlocked position, thereby improving the precision and convenience of operation.

In the present embodiment, a portion of the driving component 38 is positioned outside the accommodating space 36, and another portion of the driving component 38 extends through the outer wall of the hollow rod 35 and is connected to the locking component 34. The portion of the driving component 38 located outside the accommodating space 36 is configured to permit a user to apply an external force so as to cause the locking component 34 to move from the locked position toward the unlocked position, and, when the locking component 34 is located at the unlocked position, to drive the first sliding component 31 to slide from the unfolded position toward the folded position.

By virtue of the arrangement of the foregoing structure, the user merely needs to apply an external force to the portion of the driving component 38 that is located outside the accommodating space 36 in order to rapidly achieve unlocking. Simultaneously, when the locking component 34 is located at the unlocked position, the locking component 34 abuts against the limiting post 37 such that it can no longer move axially, and, owing to the radial length of the locking component 34 being adapted to the radial length of the accommodating space 36, the locking component 34 is also incapable of moving radially or rotating circumferentially. Moreover, at this time, since the locking component 34 is located at the unlocked position, the first sliding component 31 is already capable of sliding along the upright rod 12 between the unfolded position and the folded position, while the hollow rod 35 is inserted into the second insertion hole; at this juncture, the transmission path of the user's external force is driving component 38-locking component 34-hollow rod 35-first sliding component 31, thereby driving the first sliding component 31 to slide from the unfolded position toward the folded position. This arrangement realizes integrated linkage of the two steps of unlocking and folding, enabling completion of the two core steps of unlocking and folding through a single application of force, substantially enhancing the operational efficiency of frame folding, avoiding the cumbersome step-by-step procedure of "first unlocking, then folding" that exists in conventional structures, and markedly optimizing the user's operational experience.

In the present embodiment, the locking component 34 is provided with a limiting hole 341, the aperture of the limiting hole 341 is larger than the diameter of the limiting post 37, and the limiting post 37 passes through the limiting hole 341 such that, when the locking component 34 is located at the unlocked position, the wall forming the limiting hole 341 abuts against the limiting post 37.

The cooperation between the limiting hole 341 and the limiting post 37 can effectively restrict the axial travel distance of the locking component 34. Simultaneously, the arrangement in which the limiting post 37 passes through the limiting hole 341 can also effectively restrict circumferential rotation and radial offset of the locking component 34 within the accommodating space 36, thereby preventing the locking component 34 from becoming skewed due to vibration or external force during frame folding or use, ensuring that the locking component 34 remains constantly in a correct position, and thereby avoiding problems such as locking failure or unsmooth unlocking caused by misalignment of the locking component 34.

In the present embodiment, the lower frame 3 further includes an elastic reset component 39, and the elastic reset component 39 is connected to or abuts against the locking component 34 so that the locking component 34 has a tendency to move from the unlocked position toward the locked position.

By virtue of the arrangement of the foregoing structure, after the user applies an external force through the driving component 38 to overcome the force of the elastic reset component 39 and thereby drive the locking component 34 from the locked position to the unlocked position to complete the frame folding operation, the user only needs to release the driving component 38. The elastic potential energy stored by the elastic reset component 39 is then released, automatically driving the locking component 34 to slide axially and smoothly along the accommodating space 36 back to the locked position without requiring any additional operation by the user. This not only simplifies the operational procedure but also prevents the hidden danger of locking failure caused by the user forgetting to reset the locking component 34, thereby ensuring that the locking mechanism remains constantly in a reliable operating state and guaranteeing the safety of the frame during use. At the same time, the continuous resetting force of the elastic reset component 39 enables the locking component 34 to maintain a stable locking posture at the locked position, effectively preventing the locking component 34 from accidentally disengaging from the locked position due to vibration during frame use, external-force impact, or shaking during handling or storage, thereby avoiding accidental sliding of the first sliding component 31 or spontaneous folding of the frame. From the source, safety hazards such as tipping or component damage caused by locking failure during use are eliminated, and the load-bearing stability and safety of the frame during use are significantly improved.

In the present embodiment, the upright rod 12 is provided with a locking portion 124. When the locking component 34 is located at the locked position, the locking component 34 is inserted into the locking portion 124 so as to restrict the first sliding component 31 from sliding from the unfolded position toward the folded position. When the locking component 34 is located at the unlocked position, the locking component 34 disengages from the locking portion 124, and the first sliding component 31 is able to slide from the unfolded position toward the folded position.

When the first sliding component 31 is in the unfolded position, reliable limiting can be realized by means of the cooperation between the locking component 34 and the locking portion 124, effectively preventing the first sliding component 31 from accidentally sliding toward the folded position and thereby ensuring the stability and safety of the device in the working state. When it is necessary to switch to the folded state, it is only necessary to switch the locking component 34 to the unlocked position, thereby releasing the restriction on the first sliding component 31 and allowing the first sliding component 31 to slide smoothly from the unfolded position toward the folded position. The overall structure is simple and the operation is convenient while simultaneously taking into account use reliability and folding flexibility.

Optionally, the locking portion 124 is a locking hole, a locking groove or a locking cavity.

In the present embodiment, the upper end portion of the sliding support rod 11 is provided with a second connecting component 113, and the second upper rod 22 is connected to the second connecting component 113.

By virtue of the arrangement of the foregoing structure, problems such as connection loosening, force offset, or assembly misalignment that may occur when the second upper rod 22 is directly connected to the outer wall of the sliding support rod 11 are effectively avoided, thereby providing the second upper rod 22 with a stable force-bearing and motion pivot point and ensuring the connection stability between the second upper rod 22 and the sliding support rod 11.

In the present embodiment, the second connecting component 113 is provided with an insertion hole 1131, and the insertion hole 1131 is configured to receive insertion of the sunshade bracket 4.

By virtue of the arrangement of the foregoing structure, during use the user can insert the sunshade bracket 4 into the insertion hole 1131 and then connect the sunshade to the sunshade bracket, so that the sunshade can cover the opening of the product, thereby providing the user with shade, ensuring coolness inside the cover body, and effectively blocking direct sunlight.

In this embodiment, the second connecting component 113 is further provided with a latching component 1133, wherein the latching component 1133 includes an arc-shaped abutting surface 1133*a*. A wall that forms the insertion hole 1131 is provided with an opening 1132. The latching component 1133 is rotatable between a first position and a second position. When the sunshade bracket 4 is inserted into the insertion hole 1131, the latching component 1133 is caused to rotate to the first position under an external force, such that the arc-shaped abutting surface 1133*a* passes through the opening 1132 and abuts against the sunshade bracket 4. When the sunshade bracket 4 is required to be detached from the insertion hole 1131 of the sunshade bracket 4, the latching component 1133 is caused to rotate to the second position under an external force, such that the arc-shaped abutting surface 1133*a* disengages from the sunshade bracket 4.

Through the arrangement of the foregoing structure, when the sunshade bracket 4 is inserted into the insertion hole, an external force can drive the latching component 1133 to rotate to the first position, thereby enabling the arc-shaped abutting surface 1133*a* to pass through the opening 1132 and to closely abut against the surface of the sunshade bracket 4. By virtue of the conforming characteristic of the arc-shaped surface, surface-contact latching engagement with the sunshade bracket 4 is realized, which can effectively prevent the sunshade bracket 4 from loosening or shifting during use. At the same time, during detachment, it is only necessary to rotate the latching component 1133 to the second position to release the latching engagement; the operation is convenient and efficient, thereby effectively improving the user's operational experience.

In this embodiment, the upright rod 12 is provided with a first connecting component 121, and the rotating end of the first upper rod 21 is hinged to the first connecting component 121.

The first connecting component 121, serving as an independent hinging device, can provide sufficient movement space for the rotation of the first upper rod 21. In cooperation with the sliding of the sliding end of the first upper rod 21 along the sliding support rod 11 and the rotating action of the second upper rod 22, motion interference between the first upper rod 21 and components such as the upright rod 12 and the second upper rod 22 during rotation can be effectively avoided, thereby ensuring smooth linkage transition among actions such as rotation of the first upper rod 21, lifting of the upright rod 12, and folding of the sliding support rod 11, and improving the smoothness of folding.

In this embodiment, the first connecting component 121 is provided with a first insertion hole 1211, and the upper end of the rod body of the upright rod 12 is inserted into the first insertion hole 1211.

Through the arrangement of the foregoing structure, stable connection between the rod body of the upright rod 12 and the first insertion hole 1211 is realized, which substantially improves the fitting degree and stability of the connection and effectively avoids problems such as loosening of the connection between the first connecting component 121 and the upright rod 12, assembly misalignment, or relative displacement caused by frame vibration or applied force.

In this embodiment, the second end of the first upper rod 21 is provided with a first hinging component 213, and both the first end of the second upper rod 22 and the first end of the first upper folding rod 23 are hinged to the first hinging component 213.

Through the arrangement of the foregoing structure, centralized assembly of the second upper rod 22 and the first upper folding rod 23 on the same hinging component is realized. By integrating the hinging points of the two rods into the first hinging component 213, the structural layout of the upper rod 20 can be effectively simplified, the number of dispersed hinging points can be reduced, and assembly efficiency and assembly precision can be improved. At the same time, the structure ensures that the second upper rod 22, the first upper rod 21 and the first upper folding rod 23 synchronously rotate about the same hinging center, thereby avoiding problems such as motion interference, jamming or uneven stress on the rods caused by asynchronous hinging references, significantly enhancing linkage coordination and motion synchronization of the rods, and providing a reliable guarantee for smooth linkage of the upper rod 20.

In this embodiment, the second end of the first upper folding rod 23 is provided with a second sliding component 233, the second sliding component 233 is slidably connected to the sliding support rod 11, and both the second end of the first upper folding rod 23 and the first end of the second upper folding rod 24 are hinged to the second sliding component 233.

Through the arrangement of the foregoing structure, on the one hand, the second sliding component 233, as the sliding connection portion between the first upper folding rod 23 and the sliding support rod 11, realizes smooth sliding of the first upper folding rod 23 along the sliding support rod 11, ensuring that the first upper folding rod 23 can flexibly adjust its position during folding and unfolding of the frame, avoiding interference with other rods while providing limiting and guiding functions for the first upper folding rod 23, preventing deviation or jamming during sliding, and guaranteeing smoothness of the sliding action. On the other hand, by centrally hinging the second end of the first upper folding rod 23 and the first end of the second upper folding rod 24 to the second sliding component 233, centralized assembly of the two rods is realized, the hinging structure is simplified, the number of dispersed hinging points is reduced, linkage synchronization of the two rods is further improved, the sliding action of the first upper folding rod 23 can be synchronously transmitted to the second upper folding rod 24, the coordinated linkage between the lower frame 3 and the upper rod 20 is driven, and consistency and stability of the overall frame motion are ensured.

In this embodiment, the lower end of the upright rod 12 is provided with a second abutting component 122. One end of the lower folding rod 33 is hinged to the lower rod 32, the other end of the lower folding rod 33 is hinged to the second abutting component 122. When the first sliding component 31 is located at the unfolded position, the first sliding component 31 abuts against the second abutting component 122.

When the first sliding component 31 is located at the unfolded position, the first sliding component 31 abuts against the second abutting component 122, thereby providing an effective limiting function for the first sliding component 31 in the unfolded position and effectively avoiding the risk of accidental downward sliding of the first sliding component 31 along the rod body of the upright rod 12.

In this embodiment, the sliding support rod 11 is further provided with a first abutting component 114. When the first sliding component 31 is located at the unfolded position, the first abutting component 114 abuts against the second end of the first upper folding rod 23.

Through the arrangement of the foregoing structure, when the first sliding component 31 is located at the unfolded position, the first abutting component 114 abuts against the second end of the first upper folding rod 23. Thereby providing an effective limiting function for the first sliding component 31 in the unfolded position, effectively avoiding risks of excessive rotation, misalignment or even collision and damage with other components caused by other linkage members, and ensuring that the first sliding component 31 can accurately stop at the preset unfolded position.

The foregoing description, provided in conjunction with specific contents, represents one or more embodiments and does not mean that the specific implementations of the present disclosure are limited only to these descriptions. Any approximations or similarities to the methods, structures and the like of the present disclosure, or any technical deductions or replacements made on the premise of the inventive concept of the present disclosure, shall be deemed to fall within the protection scope of the present disclosure.

What is claimed is:

1. A foldable trolley frame for a foldable trolley, comprising:

a side frame having a sliding support rod and an upright rod;

a lower frame having a first sliding component and a lower rod, the first sliding component being slidably connected to the upright rod, one end of the lower rod being hingedly connected to the sliding support rod, the other end of the lower rod being hingedly connected to the first sliding component;

an upper frame having an upper rod and an upper folding assembly, one end of the upper rod being hingedly connected to the sliding support rod, the other end of the upper rod being hingedly connected to the upright rod, one end of the upper folding assembly being hingedly connected to the upper rod, the other end of the upper folding assembly being hingedly connected to the lower rod;

wherein the first sliding component is slidable between an unfolded position and a folded position;

wherein when the first sliding component slides from the unfolded position toward the folded position under an external force, the lower rod rotates relative to the upright rod, the upper folding assembly rotates relative to the lower rod, the upper rod rotates relative to the upright rod, and the sliding support rod moves in a direction approaching the upright rod.

2. The foldable trolley frame of claim 1, wherein the lower frame further comprises a lower folding rod having one end hingedly connected to the lower rod and the other end hingedly connected to the upright rod.

3. The foldable trolley frame of claim 1, wherein the upper rod comprises a first upper rod and a second upper rod;

a first end of the first upper rod being hingedly connected to the upright rod, a first end of the second upper rod being hingedly connected to a second end of the first upper rod, and a second end of the second upper rod being hingedly connected to the sliding support rod.

4. The foldable trolley frame of claim 3, wherein the upper folding assembly comprises a first upper folding rod and a second upper folding rod;

a first end of the first upper folding rod being hingedly connected to the first upper rod, a second end of the first upper folding rod being slidably connected to the sliding support rod;

a first end of the second upper folding rod being hingedly connected to the second end of the first upper folding rod, and a second end of the second upper folding rod being hingedly connected to the lower rod.

5. The foldable trolley frame of claim 1, wherein the sliding support rod comprises a front sliding support rod and a rear sliding support rod that are symmetrically distributed on two sides of the upright rod;

the upper rod comprises a front upper portion and a rear upper portion that are symmetrically distributed on two sides of the upright rod;

the upper folding assembly comprises a front upper folding rod and a rear upper folding rod that are symmetrically distributed on two sides of the upright rod;

the lower rod comprises a front lower rod and a rear lower rod that are symmetrically distributed on two sides of the upright rod;

one end of the front upper portion is hingedly connected to the front sliding support rod and the other end of the front upper portion is hingedly connected to the upright rod;

one end of the rear upper portion is hingedly connected to the rear sliding support rod and the other end of the rear upper portion is hingedly connected to the upright rod;

one end of the front upper folding rod is hingedly connected to the front upper portion and the other end of the front upper folding rod is hingedly connected to the front lower rod;

one end of the rear upper folding rod is hingedly connected to the rear upper portion and the other end of the rear upper folding rod is hingedly connected to the rear lower rod;

one end of the front lower rod is hingedly connected to the front sliding support rod and the other end of the front lower rod is hingedly connected to the first sliding component;

one end of the rear lower rod is hingedly connected to the rear sliding support rod and the other end of the rear lower rod is hingedly connected to the first sliding component.

6. The foldable trolley frame of claim 1, wherein the lower frame further comprises a locking component, the locking component is connected to the first sliding component, and the locking component is movable between a locked position and an unlocked position; when the locking component is in the locked position, the locking component restricts the first sliding component from sliding from the unfolded position toward the folded position; when the locking component is in the unlocked position, the first sliding component is able to slide from the unfolded position toward the folded position.

7. The foldable trolley frame of claim 6, wherein the lower frame further comprises a driving component, the driving component is connected to the locking component, the driving component drives the locking component to move from the locked position to the unlocked position, and when the locking component is in the unlocked position, the driving component drives the first sliding component to slide from the unfolded position toward the folded position.

8. The foldable trolley frame of claim 7, wherein the lower frame further comprises a hollow rod, the hollow rod is connected to the first sliding component, the hollow rod being provided with an accommodating space inside, the locking component is located in the accommodating space, and a radial length of the locking component is adapted to a radial length of the accommodating space so that the locking component is able to move only axially along the accommodating space.

9. The foldable trolley frame of claim 8, wherein the lower frame further comprises a limiting post, the limiting post passes through an outer wall of the hollow rod and the first sliding component, and a portion of the limiting post is located in the accommodating space and when the locking component is in the unlocked position, the locking component abuts against the limiting post.

10. The foldable trolley frame of claim 8, wherein a portion of the driving component is located outside the accommodating space, another portion of the driving component passes through the outer wall of the hollow rod and is connected to the locking component, and the portion of the driving component located outside the accommodating space is configured to allow a user to apply an external force so that the locking component moves from the locked position toward the unlocked position and, when the locking component is in the unlocked position, drives the first sliding component to slide from the unfolded position toward the folded position.

11. The foldable trolley frame of claim 9, wherein the locking component is provided with a limiting hole, an aperture of the limiting hole is larger than a diameter of the limiting post, the limiting post passes through the limiting hole, and when the locking component is in the unlocked position, a wall forming the limiting hole abuts against the limiting post.

12. The foldable trolley frame of claim 6, wherein the lower frame further comprises an elastic reset component, the elastic reset component is connected to or abuts against the locking component so that the locking component has a tendency to move from the unlocked position toward the locked position.

13. The foldable trolley frame of claim 6, wherein the upright rod is provided with a locking portion such that when the locking component is in the locked position, the locking component is inserted into the locking portion to restrict the first sliding component from sliding from the unfolded position toward the folded position; and when the locking component is in the unlocked position, the locking component is disengaged from the locking portion, and the first sliding component is able to slide from the unfolded position toward the folded position.

14. The foldable trolley frame of claim 3, wherein the upright rod is provided with a first connecting component, and the first end of the first upper rod is hingedly connected to the first connecting component.

15. The foldable trolley frame of claim 14, wherein the first connecting component is provided with a first insertion hole, and an upper end of a rod body of the upright rod is inserted into the first insertion hole.

16. The foldable trolley frame of claim 4, wherein a first end of the first upper rod is provided with a first hinging component, and both the first end of the second upper rod and the first end of the first upper folding rod are hinged to the first hinging component.

17. The foldable trolley frame of claim 4, wherein a second end of the first upper folding rod is provided with a second sliding component, the second sliding component is slidably connected to the sliding support rod, and both the second end of the first upper folding rod and the first end of the second upper folding rod are hingedly connected to the second sliding component.

18. The foldable trolley frame of claim 2, wherein a lower end of the upright rod is provided with a second abutting component, one end of the lower folding rod is hingedly connected to the lower rod, the other end of the lower folding rod is hingedly connected to the second abutting component, and when the first sliding component is in the unfolded position, the first sliding component abuts against the second abutting component.

19. The foldable trolley frame of claim 4, wherein the sliding support rod is further provided with a first abutting component, and when the first sliding component is in the unfolded position, the first abutting component abuts against the second sliding component on the second end of the first upper folding rod.

20. A foldable trolley, comprising the foldable trolley frame of claim 1.

* * * * *